US012623359B2

(12) United States Patent
Okabe

(10) Patent No.: US 12,623,359 B2
(45) Date of Patent: May 12, 2026

(54) END EFFECTOR AND SUBSTRATE PROCESSING APPARATUS INCLUDING END EFFECTOR

(71) Applicant: ASM IP Holding B.V., Almere (NL)

(72) Inventor: Taira Okabe, Kawasaki (JP)

(73) Assignee: ASM IP Holding B.V., Almere (NL)

( * ) Notice: Subject to any disclaimer, the term of this patent is extended or adjusted under 35 U.S.C. 154(b) by 218 days.

(21) Appl. No.: 18/543,906

(22) Filed: Dec. 18, 2023

(65) Prior Publication Data

US 2024/0198538 A1     Jun. 20, 2024

Related U.S. Application Data

(60) Provisional application No. 63/476,329, filed on Dec. 20, 2022.

(51) Int. Cl.
B25J 15/00 (2006.01)
B06B 1/06 (2006.01)
B25J 11/00 (2006.01)

(52) U.S. Cl.
CPC ......... B25J 15/0014 (2013.01); B06B 1/0629 (2013.01); B25J 11/0095 (2013.01); B25J 15/0004 (2013.01); B25J 15/0019 (2013.01); B06B 2201/70 (2013.01)

(58) Field of Classification Search
None
See application file for complete search history.

(56) References Cited

U.S. PATENT DOCUMENTS

| 7,963,736 B2 | 6/2011 | Takizawa |
| 8,041,450 B2 | 10/2011 | Takizawa |
| 8,590,956 B2 * | 11/2013 | Coady ..................... H01L 21/68 |
| | | 414/941 |
| 8,864,202 B1 * | 10/2014 | Schrameyer ......... B25J 15/0014 |
| | | 294/902 |
| 11,004,713 B2 * | 5/2021 | Houng .............. H01L 21/67265 |
| 2011/0188974 A1 * | 8/2011 | Diamond .......... H01L 21/67754 |
| | | 414/217 |
| 2012/0325148 A1 | 12/2012 | Yamagishi |

OTHER PUBLICATIONS

Miyajima, CN103832826B "floating conveying heat treatment device", May 24, 2017, all pages. (Year: 2017).*

* cited by examiner

*Primary Examiner* — Michael S Lowe
(74) *Attorney, Agent, or Firm* — Banner & Witcoff, Ltd.

(57) ABSTRACT

An End effector is disclosed. The exemplary end effector includes a substrate-supporting body for placing the substrate thereon; and a first array of wave generators disposed in the substrate-supporting body and configured to generate a surface wave to a backside of the substrate.

10 Claims, 5 Drawing Sheets

75

72

75

72

END EFFECTOR AND SUBSTRATE PROCESSING APPARATUS INCLUDING END EFFECTOR

CROSS-REFERENCE TO RELATED APPLICATION(S)

This application claims the benefit of U.S. Provisional Application 63/476,329 filed on Dec. 20, 2022, the entire contents of which are incorporated herein by reference.

FIELD OF INVENTION

The present disclosure relates generally to an end effector. More particularly, exemplary embodiments of the present disclosure relate to an end effector for transporting a substrate and a substrate processing apparatus including an end effector.

BACKGROUND OF THE DISCLOSURE

A process of substrate processing apparatus may include a step of transporting a substrate from a Front Opening Unified Pod (FOUP) to a reaction chamber via a substrate handling chamber and a load lock chamber using a robotic arm or a step of transporting a substrate from a reaction chambers to another reaction chamber using a robotic arm. The robotic arm may be provided with an end effector for loading a substrate thereon and carrying the substrate from one chamber to another.

Typically, the end effector does not have a mechanical clamping mechanism for clamping a substrate, and by a substrate positioning or alignment mechanism (e.g., those disclosed in U.S. Patent Application Publication No. 2012/0325148, U.S. Pat. Nos. 7,963,736, and 8,041,450, each disclosure of which is herein incorporated by reference in its entirety), a substrate is placed on the end effector for transfer. The substrate stays on the end effector while being carried by friction against a surface of the end effector, which is caused by gravity.

An anti-slip end effector having several pads are used to hold the substrate. A need exists for properly positioning substrates.

Any discussion, including discussion of problems and solutions, set forth in this section, has been included in this disclosure solely for the purpose of providing a context for the present disclosure, and should not be taken as an admission that any or all of the discussion was known at the time the invention was made or otherwise constitutes prior art.

This summary is provided to introduce a selection of concepts in a simplified form. These concepts are described in further detail in the detailed description of example embodiments of the disclosure below. This summary is not intended to identify key features or essential features of the claimed subject matter, nor is it intended to be used to limit the scope of the claimed subject matter.

In accordance with exemplary embodiments of the disclosure, an end effector is provided. The end effector for transferring a substrate may comprise a substrate-supporting body for placing the substrate thereon; and a first array of wave generators disposed in the substrate-supporting body and configured to generate a surface wave to a backside of the substrate.

In various embodiments, the substrate-supporting body may comprise a mounting end and a distal end; wherein the mounting end may be attached to a robotic arm; wherein a first finger and a second finger are disposed at the distal end.

In various embodiments, the robotic arm may be configured to move vertically, front and rear, and laterally.

In various embodiments, the first array of wave generators may be disposed on the first finger.

In various embodiments, the end effector may further comprise a second array of wave generators on the second finger.

In various embodiments, the end effector may further comprise a third array of wave generators on the mounting end.

In various embodiments, the array of wave generators may comprise: a plurality of piezoelectric elements for generating surface waves; and a slider disposed on the piezoelectric devices and configured to move the substrate.

In various embodiments, the end effector may further comprise an AC power source, being configured to apply an AC power to the piezoelectric element.

In various embodiments, the number of the piezoelectric elements may be 9 to 100.

In various embodiments, the substrate-supporting body may comprise Al203.

In various embodiments, a substrate processing apparatus may comprise: a reaction chamber for processing a substrate; a substrate handling chamber attached to the reaction chamber; a backend robot disposed in the substrate handling chamber; and a load lock chamber for loading or unloading the substrate, the load lock chamber being attached to the substrate handling chamber; wherein the backend robot may include the end effector.

In various embodiments, a method for positioning a substrate may comprise: placing the substrate on an array of wave generators array of an end effector; applying waves to the substrate by the array of wave generators, thereby correcting the position of substrate.

BRIEF DESCRIPTION OF THE DRAWING FIGURES

A more complete understanding of exemplary embodiments of the present disclosure can be derived by referring to the detailed description and claims when considered in connection with the following illustrative figures.

Figure 1:
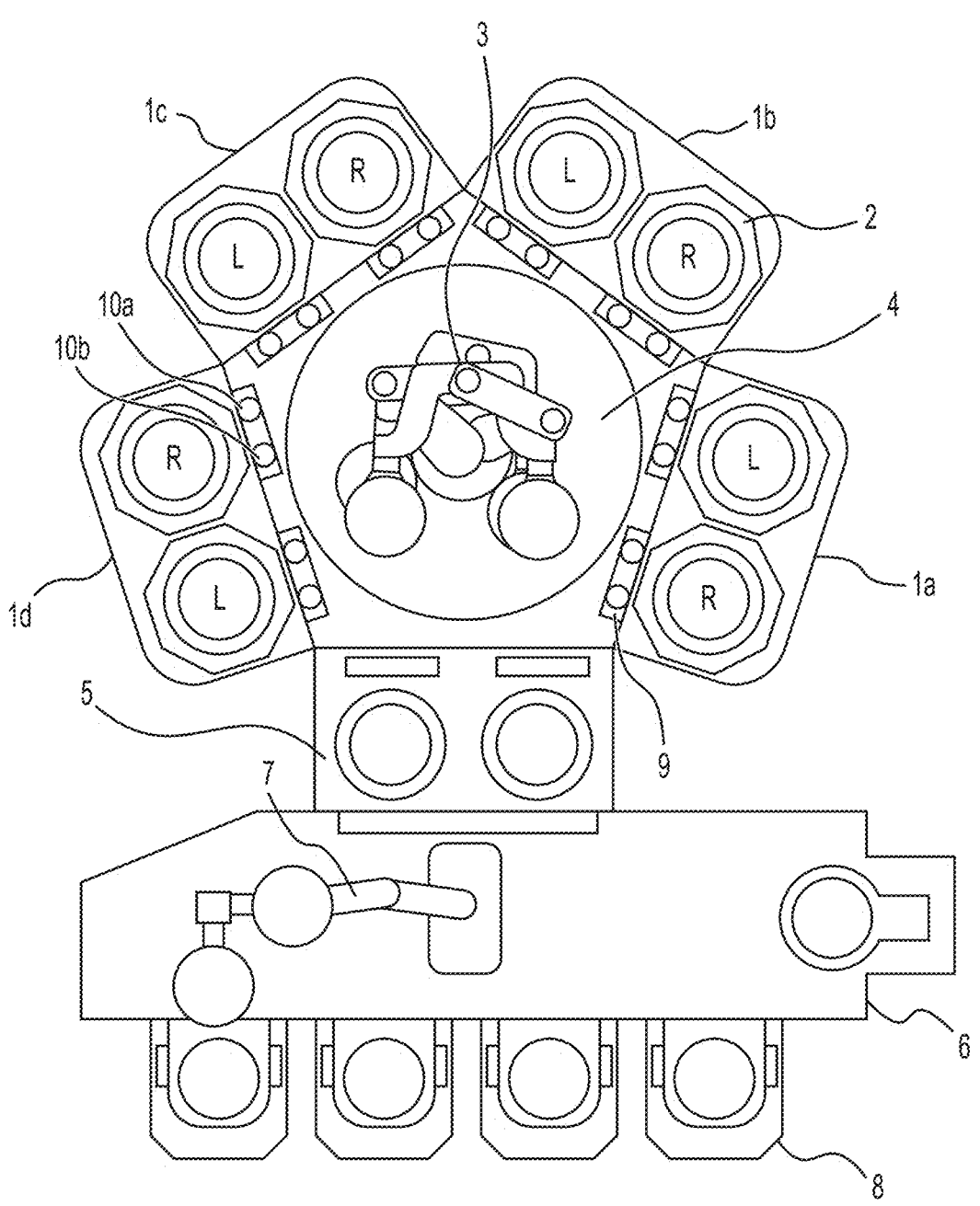
FIG. 1 is a schematic plan view of a semiconductor processing apparatus with dual chamber modules usable in an embodiment of the present invention.

It will be appreciated that elements in the figures are illustrated for simplicity and clarity and have not necessarily been drawn to scale. For example, the dimensions of some of the elements in the figures may be exaggerated relative to other elements to help understanding of illustrated embodiments of the present disclosure.

DETAILED DESCRIPTION OF EXEMPLARY EMBODIMENTS

Although certain embodiments and examples are disclosed below, it will be understood by those in the art that the invention extends beyond the specifically disclosed embodiments and/or uses of the invention and obvious modifications and equivalents thereof. Thus, it is intended that the scope of the invention disclosed should not be limited by the particular disclosed embodiments described below As used herein, the term "substrate" may refer to any underlying material or materials, including any underlying material or materials that may be modified, or upon which, a device, a circuit, or a film may be formed. The "substrate" may be continuous or non-continuous; rigid or flexible; solid or porous; and combinations thereof. The substrate may be in any form, such as a powder, a plate, or a workpiece. Substrates in the form of a plate may include wafers in various shapes and sizes. Substrates may be made from semiconductor materials, including, for example, silicon, silicon germanium, silicon oxide, gallium arsenide, gallium nitride and silicon carbide.

As examples, a substrate in the form of a powder may have applications for pharmaceutical manufacturing. A porous substrate may comprise polymers. Examples of workpieces may include medical devices (for example, stents and syringes), jewelry, tooling devices, components for battery manufacturing (for example, anodes, cathodes, or separators) or components of photovoltaic cells, etc.

A continuous substrate may extend beyond the bounds of a process chamber where a deposition process occurs. In some processes, the continuous substrate may move through the process chamber such that the process continues until the end of the substrate is reached. A continuous substrate may be supplied from a continuous substrate feeding system to allow for manufacture and output of the continuous substrate in any appropriate form.

Non-limiting examples of a continuous substrate may include a sheet, a non-woven film, a roll, a foil, a web, a flexible material, a bundle of continuous filaments or fibers (for example, ceramic fibers or polymer fibers). Continuous substrates may also comprise carriers or sheets upon which non-continuous substrates are mounted.

The illustrations presented herein are not meant to be actual views of any particular material, structure, or device, but are merely idealized representations that are used to describe embodiments of the disclosure.

The particular implementations shown and described are illustrative of the invention and its best mode and are not intended to otherwise limit the scope of the aspects and implementations in any way. Indeed, for the sake of brevity, conventional manufacturing, connection, preparation, and other functional aspects of the system may not be described in detail. Furthermore, the connecting lines shown in the various figures are intended to represent exemplary functional relationships and/or physical couplings between the various elements. Many alternative or additional functional relationship or physical connections may be present in the practical system, and/or may be absent in some embodiments.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. Thus, the various acts illustrated may be performed in the sequence illustrated, in other sequences, or omitted in some cases.

The subject matter of the present disclosure includes all novel and nonobvious combinations and subcombinations of the various processes, systems, and configurations, and other features, functions, acts, and/or properties disclosed herein, as well as any and all equivalents thereof.

FIG. 1 is a schematic plan view of a substrate processing apparatus with dual chamber modules in some embodiments of the present invention. The substrate processing apparatus may comprise four dual chamber modules 1a, 1b, 1c, 1d (each provided with two reaction chambers 2), a load lock chamber 5, and a substrate handling chamber 4 provided with back end robots 3, desirably in conjunction with controllers programmed to conduct the sequences described below, which can be used in some embodiments of the present invention.

In this embodiment, the substrate processing apparatus may comprise: (i) four dual chamber modules 1a-1d, each having two reaction chambers 2 arranged side by side (left (L) and right (R)) with their fronts aligned in a line; (ii) a substrate handling chamber 4 including two back end robots 3 (substrate handling robots), each having at least two end-effectors accessible to the two reaction chambers of each unit simultaneously, said substrate handling chamber 4 having a polygonal shape having four sides corresponding to and being attached to the four chamber modules 1a-1d, respectively, and one additional side for a load lock chamber 5, all the sides being disposed on the same plane; and (iii) a load lock 5 for loading or unloading two substrates simultaneously, the load lock chamber 5 being attached to the one additional side of the substrate handling chamber 4, wherein each back end robot 3 is accessible to the load lock chamber 5.

The interior of each chamber 2 and the interior of the load lock chamber 5 may be isolated from the interior of the substrate handling chamber 4 by a gate valve 9. Further, auto wafer centering (AWC) sensors 10a, 10b may be disposed near the gate valve 9 between each chamber 2 and the substrate handling chamber 4 to determine, for example, at least an eccentricity of the substrate relative to a predetermined location of the back end robot 3.

In some embodiments, a controller (not shown) may store software programmed to execute sequences of substrate transfer, for example. The controller may also: (1) check the status of each reaction chamber; (2) may position substrates in each reaction chamber using sensing systems including the AWC sensors 10a, 10b; (3) may control a gas box and an electric box for each module; (4) may control a front end robot 7 in an equipment front end module 6 based on a distribution status of substrates stored in the FOUP 8 and the load lock chamber 5; (5) may control the back end robots 3; and/or (6) may control the gate valves 9 as shown in FIG. 1.

A skilled artisan may appreciate that the apparatus includes one or more controller(s) programmed or otherwise configured to cause the deposition and reactor cleaning processes described elsewhere herein to be conducted. The controller(s) may communicate with the various power sources, heating systems, pumps, robotics and gas flow controllers or valves of the reactor, as will be appreciated by the skilled artisan.

In some embodiments, the apparatus may have any number of chamber modules and reaction chambers greater than one (e.g., 2, 3, 4, 5, 6, or 7). In FIG. 1, the apparatus has eight reaction chambers, but it may have ten or more. In some embodiments, the reaction chamber of the modules may be any suitable reactors for processing or treating wafers, including CVD reactors such as plasma-enhanced CVD reactors and thermal CVD reactors, ALD reactors such as plasma-enhanced ALD reactors and thermal ALD reactors, etching reactors, and UV-curing reactors. Typically, the reaction chambers are plasma reactors for depositing a thin film or layer on a wafer. In some embodiments, all the modules may be of the same type having identical capability for treating wafers so that the unloading/loading can sequentially and regularly be timed, thereby increasing productivity or throughput. In some embodiments, the modules may have different capacities (e.g., different treatments), but their handling times are substantially identical.

Figure 2:
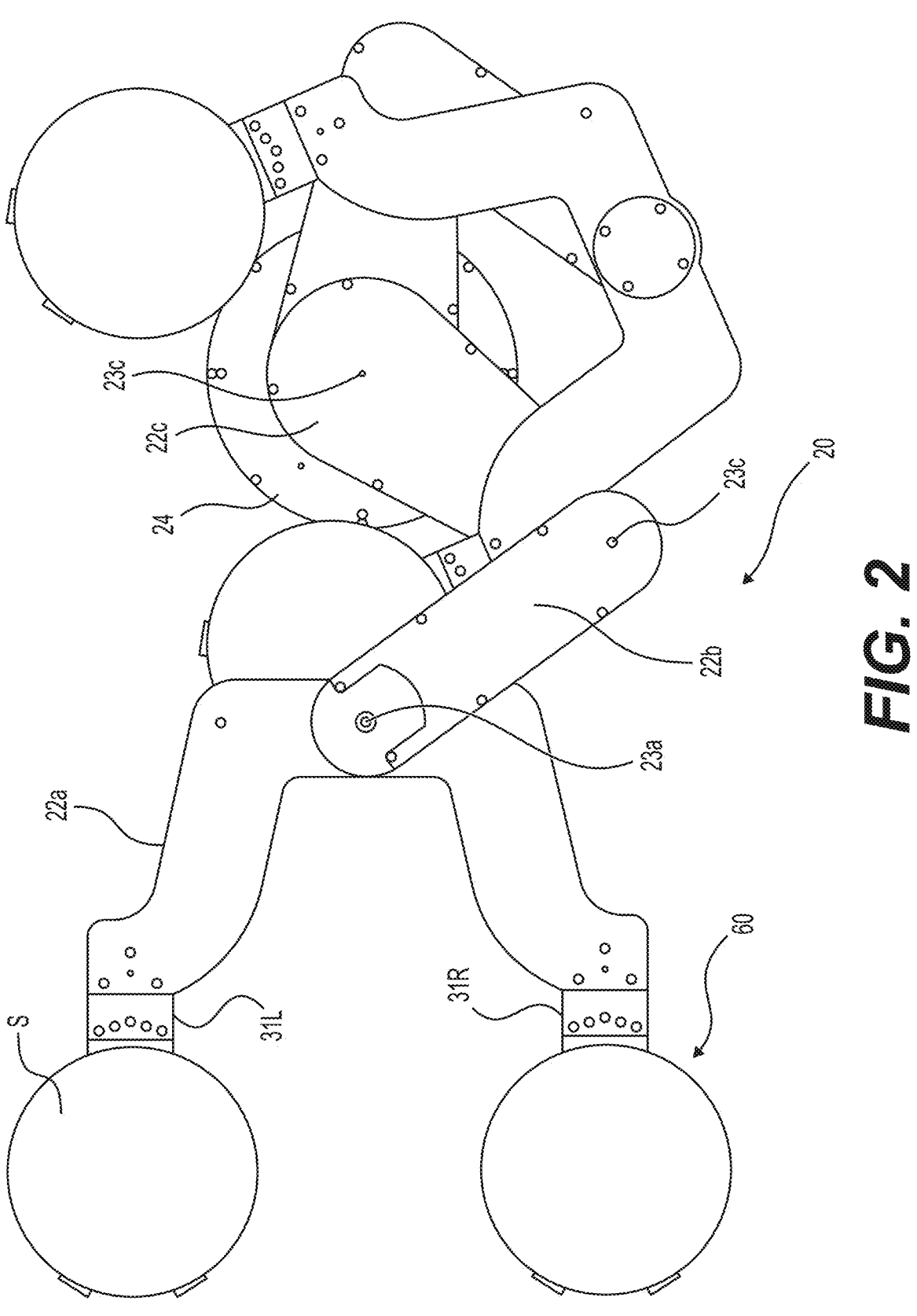
FIG. 2 is a schematic plan view of a dual arm wafer-handling robot usable in an embodiment of the present invention.

FIG. 2 is a schematic plan view of a dual arm substrate handling robot usable in an embodiment of the present invention. An end effector 60 may be configured to be attached to a robotic arm 20. In some embodiments, this type of dual-arm substrate-handling robot may preferably be used in an apparatus illustrated in FIG. 1. However, when the number of reaction chambers is four or less, for example, a single-arm wafer-handling robot can be used. As shown in FIG. 2, the robotic arm 20 may be comprised of a fork-shaped portion 22a, a middle portion 22b, and a bottom portion 22c. The fork-shaped portion 22a may be connected to the end-effectors 60 for supporting substrates thereon. The fork-shaped portion 22a and the middle portion 22b may be connected via a joint 23a; the middle portion 22b and the bottom portion 22c may be connected via a joint 23b; and the bottom portion 22c may be connected to an actuator 24 via a joint 23c.

Figure 3:
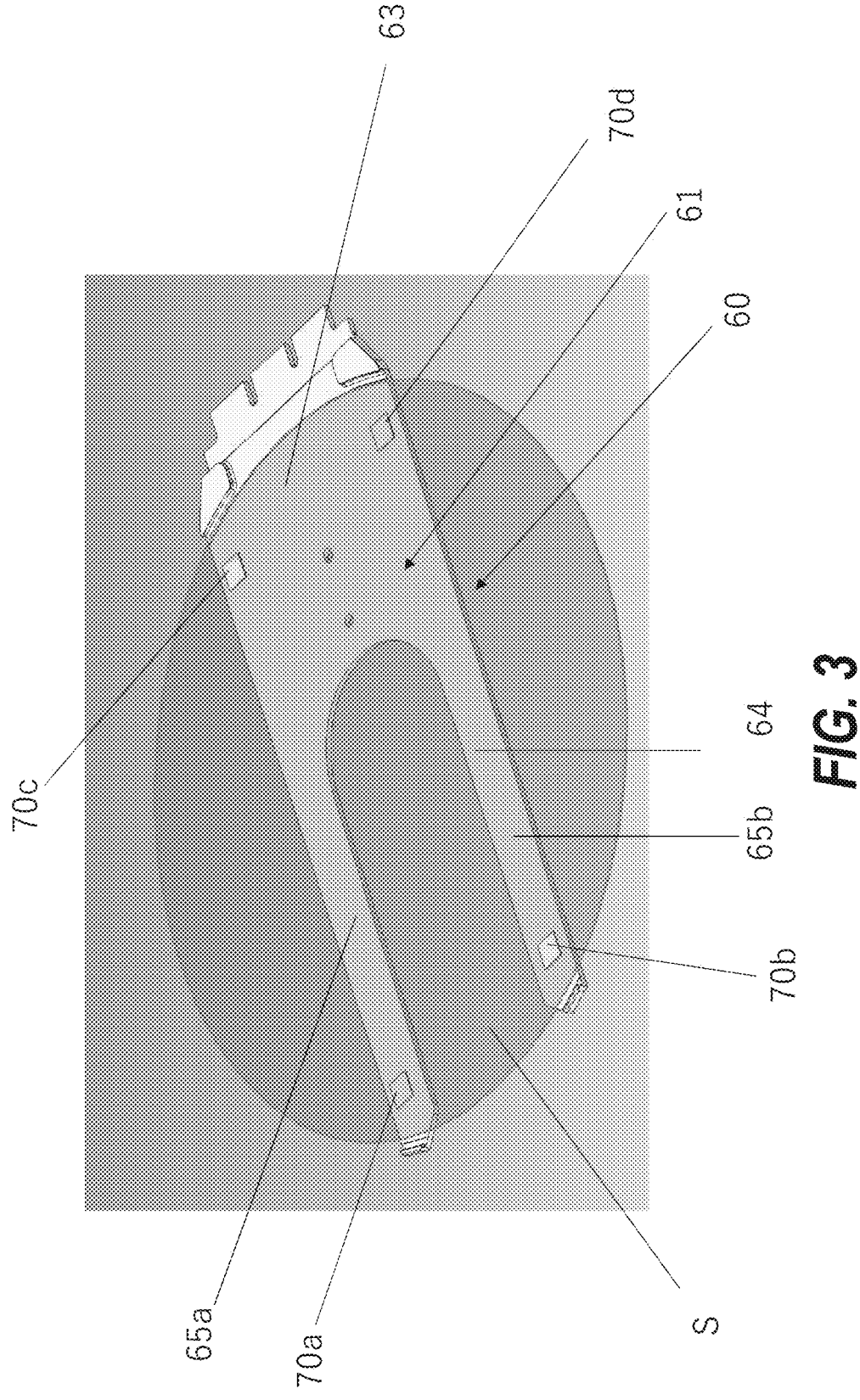
FIG. 3 is a schematic perspective view of an end effector according to an embodiment of the present invention.

FIG. 3 is a schematic perspective view of an end effector according to an embodiment of the present invention. The end effector 60 may comprise a substrate-supporting body 61 for placing a substrate S thereon and at least one array of wave generators 70a to 70d disposed in the substrate-supporting body 61. The array of wave generators 70a to 70d may be configured to generate a surface wave to a backside of the substrate S.

The substrate-supporting body 61 may comprise a mounting end 63 and a distal end 64. The substrate-supporting body may comprise Al2O3. The mounting end 63 may be attached to a robotic arm 20. The robotic arm 20 may be configured to move vertically, forward and backward, and laterally.

A first finger 65a and a second finger 65b may be disposed at the distal end 64. The first array of wave generators 70a may be disposed on the first finger 65a.

The end effector 60 may further comprise a second array of wave generators 70b on the second finger 65b. The end effector 60 may further include a third array of wave generators 70c on the mounting end 63. Furthermore, the end effector 60 may further include a fourth array of wave generators 70d on the mounting end 63.

Figure 4B:
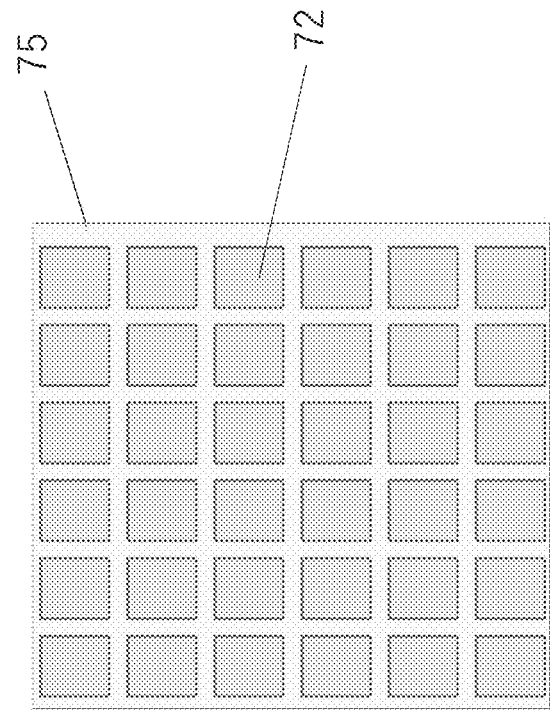
FIG. 4b is a schematic top view of an array of wave generators according to an embodiment of the present invention.
Figure 4A:
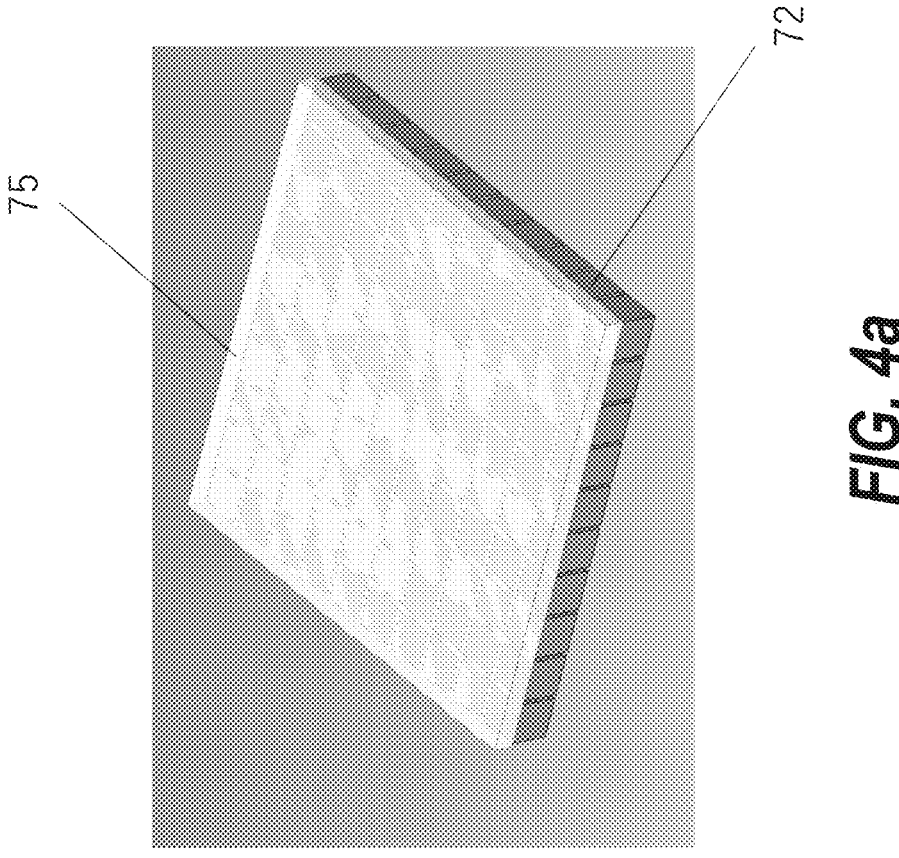
FIG. 4a is a schematic perspective view of an array of wave generators according to an embodiment of the present invention.

FIG. 4a is a schematic perspective view of an array of wave generators according to an embodiment of the present invention. FIG. 4b is a schematic top view of an array of wave generators according to an embodiment of the present invention.

The arrays of wave generators 70a to 70d may comprise a plurality of piezoelectric elements 72 for generating surface waves and a slider 75 disposed on the piezoelectric devices 72. The number of the piezoelectric elements 72 may range between 9 to 100. The slider 75 may be configured to move the substrate.

Figure 5:
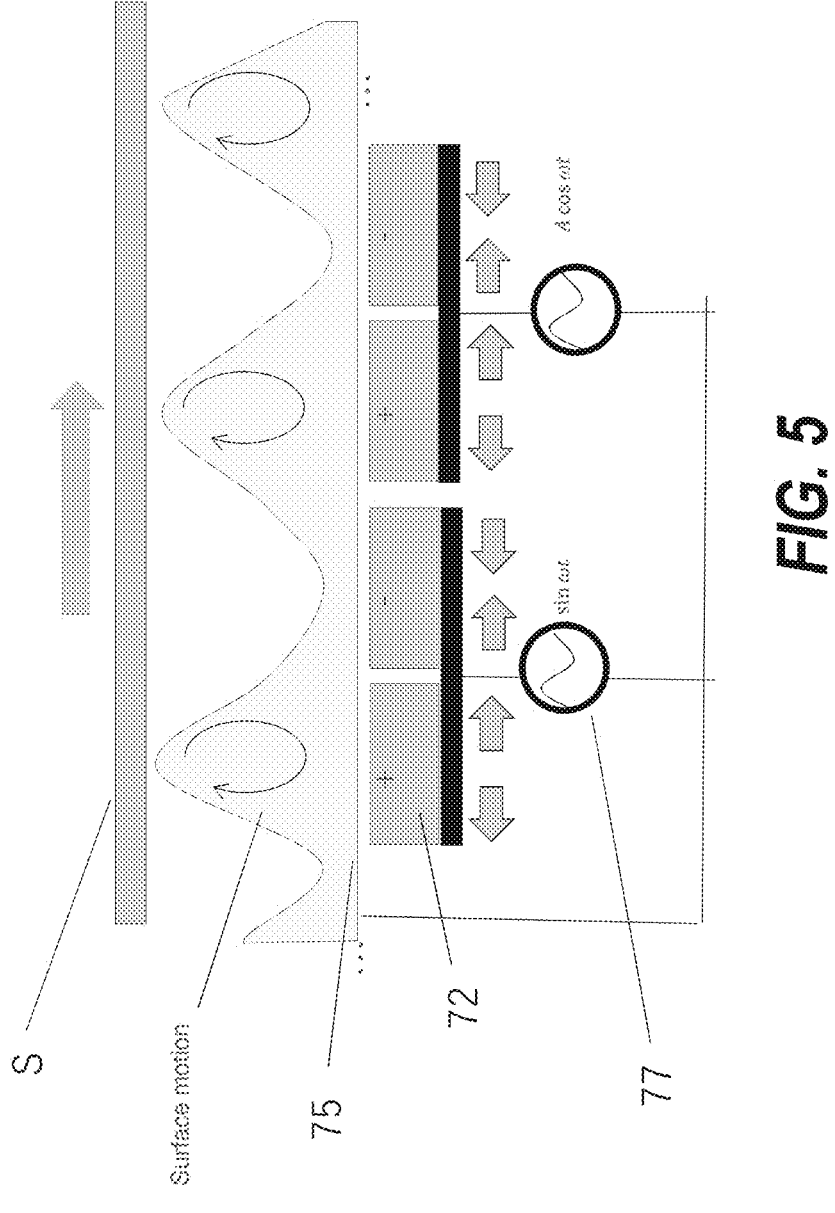
FIG. 5 is a schematic cross-sectional view of an array of wave generators according to an embodiment of the present invention.

FIG. 5 is a schematic cross-sectional of an array of wave generators according to an embodiment of the present invention. The end effector may further comprise an AC power source 77. The AC power source 77 may be configured to apply an AC power to the piezoelectric element 72, thereby moving the slider 75. A surface motion of the slider may correct the position of substrate S.

The example embodiments of the disclosure described above do not limit the scope of the invention, since these embodiments are merely examples of the embodiments of the invention. Any equivalent embodiments are intended to be within the scope of this invention. Indeed, various modifications of the disclosure, in addition to those shown and described herein, such as alternative useful combinations of the elements described, may become apparent to those skilled in the art from the description. Such modifications and embodiments are also intended to fall within the scope of the appended claims.

What is claimed is:

1. An end effector for transferring a substrate, comprising:
a substrate-supporting body for placing the substrate thereon; and
a first array of wave generators disposed in the substrate-supporting body and configured to generate a surface wave to a backside of the substrate, the first array of wave generators comprising
a plurality of piezoelectric elements for generating surface waves; and
a slider disposed on the piezoelectric elements and configured to move the substrate.

2. The end effector according to claim 1, wherein the substrate-supporting body comprises a mounting end and a distal end,
wherein the mounting end is attached to a robotic arm, and
wherein a first finger and a second finger are disposed at the distal end.

3. The end effector according to claim 2, wherein the robotic arm is configured to move vertically, front and rear, and laterally.

4. The end effector according to claim 3, further comprising a third array of wave generators disposed on the mounting end.

5. The end effector according to claim 2, wherein the first array of wave generators is disposed on the first finger.

6. The end effector according to claim 2, further comprising a second array of wave generators disposed on the second finger.

7. The end effector according to claim 1, further comprising an AC power source, being configured to apply AC power to each piezoelectric element.

8. The end effector according to claim 1, wherein a number of the piezoelectric elements is 9 to 100.

9. The end effector according to claim 1, wherein the substrate-supporting body comprises Al2O3.

10. A substrate processing apparatus comprising:
a reaction chamber for processing a substrate;
a substrate handling chamber attached to the reaction chamber;
a backend robot disposed in the substrate handling chamber; and
a load lock chamber for loading or unloading the substrate, the load lock chamber being attached to the substrate handling chamber,
wherein the backend robot includes an end effector for transferring the substrate, the end effector comprising a substrate-supporting body for placing the substrate thereon; and a first array of wave generators disposed in the substrate-supporting body and configured to generate a surface wave to a backside of the substrate, the first array of wave generators comprising a plurality of piezoelectric elements for generating surface waves; and a slider disposed on the piezoelectric elements and configured to move the substrate.

\* \* \* \* \*